US011010118B2

(12) United States Patent
Tanaka

(10) Patent No.: US 11,010,118 B2
(45) Date of Patent: May 18, 2021

(54) INFORMATION PROCESSING SYSTEM, INFORMATION PROCESSING APPARATUS, AND SERVER COMPRISING: PROCESSING CIRCUITRY CONFIGURED TO: STORE, IN A MEMORY OF THE SERVER, A PRINT JOB RECEIVED FROM AN INFORMATION PROCESSING APPARATUS THAT CREATES AND STORES THE PRINT JOB LOCALLY SO THAT THE PRINT JOB IS STORED BOTH IN THE MEMORY OF THE SERVER AND IN THE INFORMATION PROCESSING APPARATUS AT A SAME TIME

(71) Applicant: Kensuke Tanaka, Kanagawa (JP)

(72) Inventor: Kensuke Tanaka, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/578,645

(22) Filed: Sep. 23, 2019

(65) Prior Publication Data

US 2020/0104084 A1   Apr. 2, 2020

(30) Foreign Application Priority Data

Sep. 28, 2018  (JP) .............................. JP2018-184487
Aug. 5, 2019   (JP) .............................. JP2019-143834

(51) Int. Cl.
*G06F 3/12* (2006.01)

(52) U.S. Cl.
CPC .......... *G06F 3/1271* (2013.01); *G06F 3/1203* (2013.01); *G06F 3/1288* (2013.01)

(58) Field of Classification Search
USPC ................................. 358/1.1–3.29, 1.11–1.18
See application file for complete search history.

(56) References Cited

U.S. PATENT DOCUMENTS

| 6,452,692 | B1* | 9/2002 | Yacoub ................. G06F 3/1204 |
| | | | 358/1.13 |
| 6,976,072 | B2* | 12/2005 | Mathieson ............ G06F 9/5027 |
| | | | 709/223 |
| 9,830,348 | B2* | 11/2017 | Barabas ..................... G06F 9/46 |
| 2012/0060122 | A1 | 3/2012 | Tanaka |

(Continued)

FOREIGN PATENT DOCUMENTS

| JP | 2001-216116 | 8/2001 |
| JP | 2002-297330 | 10/2002 |
| JP | 2018-049594 | 3/2018 |

*Primary Examiner* — Marcellus J Augustin
(74) *Attorney, Agent, or Firm* — Obion, McClelland, Maier & Neustadt, L.L.P.

(57) ABSTRACT

An information processing system, an information processing apparatus, and a server. The information processing system includes an information processing apparatus and a server connected to the information processing apparatus through a network. The information processing apparatus generates a print job, stores the print job, and transmits the print job to the server. The server stores the print job received from the information processing apparatus, generates management information including information on print jobs stored on the information processing apparatus and information on print jobs stored on the server, and transmits the management information to a printing apparatus that executes printing based on the print job.

11 Claims, 11 Drawing Sheets

(56) References Cited

U.S. PATENT DOCUMENTS

| | | | |
|---|---|---|---|
| 2012/0229851 A1* | 9/2012 | Nishida | G06F 3/1238 358/1.15 |
| 2013/0120784 A1* | 5/2013 | Takagi | H04N 1/0023 358/1.14 |
| 2013/0176594 A1 | 7/2013 | Tanaka | |
| 2016/0274946 A1 | 9/2016 | Tanaka | |
| 2017/0161000 A1* | 6/2017 | Masuda | G06F 3/1288 |
| 2017/0188059 A1* | 6/2017 | Major | H04N 21/2402 |
| 2018/0203655 A1* | 7/2018 | Nishida | G06F 3/1238 |
| 2018/0210686 A1* | 7/2018 | Takigawa | G06F 3/1288 |
| 2018/0270216 A1 | 9/2018 | Nakayama | |
| 2018/0349068 A1* | 12/2018 | Ozawa | G06F 3/1238 |

* cited by examiner

FIG. 4A

JOB LIST

| JOB ID | USER ID | JOB INFORMATION | FILE NAME | FILE PATH |
|---|---|---|---|---|
| 1 | 1 | ONE-SIDED/COLOR | Document1.doc | C:¥data¥data1.dat |
| 2 | 2 | DUPLEX/COLOR | Image1.jpg | C:¥data¥data2.dat |
| 3 | 2 | ONE-SIDED/ BLACK AND WHITE | Text2.txt | C:¥data¥data3.dat |

LOCATION INFORMATION

| LOCATION ID | TYPE | USER ID | PROTOCOL | PORT | ADDRESS |
|---|---|---|---|---|---|
| 1 | PRINT SERVER | 1 | HTTPS | 8443 | 192.168.1.1 |
| 2 | PRINT SERVER | 2 | HTTPS | 8443 | 192.168.1.1 |
| 3 | CLIENT PC | 2 | HTTP | 8080 | 192.168.2.3 |

INTEGRATED LIST 501

| JOB ID | JOB INFORMATION | FILE NAME | FILE PATH | TYPE | LOCATION |
|---|---|---|---|---|---|
| 2 | DUPLEX/COLOR | Image1.jpg | C:¥data¥data2.dat | PRINT SERVER | https:// 192.168.1.1:8443 |
| 3 | ONE-SIDED/ BLACK AND WHITE | Text2.txt | C:¥data¥data3.dat | PRINT SERVER | https:// 192.168.1.1:8443 |
| 2 | DUPLEX/COLOR | Image1.jpg | C:¥data¥data2.dat | CLIENT PC | http:// 192.168.1.2:8080 |
| 3 | ONE-SIDED/ BLACK AND WHITE | Text2.txt | C:¥data¥data3.dat | CLIENT PC | http:// 192.168.1.2:8080 |

FIG. 5B

INTEGRATED LIST 502

| JOB ID | JOB INFORMATION | FILE NAME | FILE PATH | TYPE | LOCATION |
|---|---|---|---|---|---|
| 1 | DUPLEX/COLOR | Document1.doc | C:¥data¥data1.dat | PRINT SERVER | https:// 192.168.1.1:8443 |

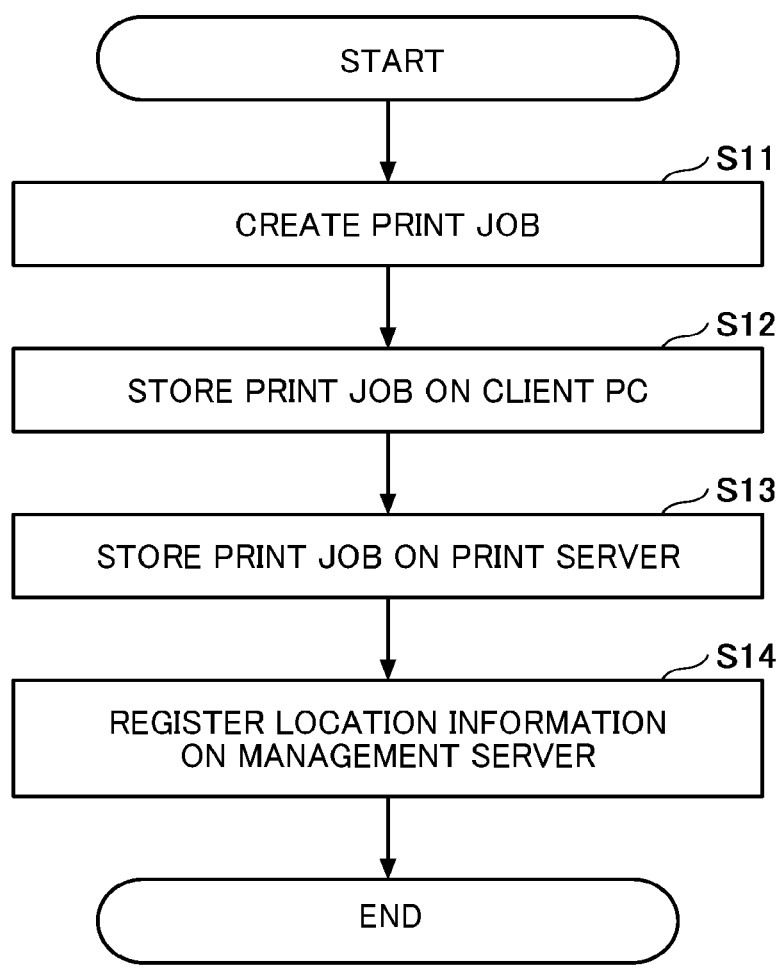

INFORMATION PROCESSING SYSTEM, INFORMATION PROCESSING APPARATUS, AND SERVER COMPRISING: PROCESSING CIRCUITRY CONFIGURED TO: STORE, IN A MEMORY OF THE SERVER, A PRINT JOB RECEIVED FROM AN INFORMATION PROCESSING APPARATUS THAT CREATES AND STORES THE PRINT JOB LOCALLY SO THAT THE PRINT JOB IS STORED BOTH IN THE MEMORY OF THE SERVER AND IN THE INFORMATION PROCESSING APPARATUS AT A SAME TIME

CROSS-REFERENCE TO RELATED APPLICATIONS

This patent application is based on and claims priority pursuant to 35 U.S.C. § 119(a) to Japanese Patent Application Nos. 2018-184487, filed on Sep. 28, 2018, and 2019-143834, filed on Aug. 5, 2019 in the Japan Patent Office, the entire disclosure of which is hereby incorporated by reference herein.

BACKGROUND

Technical Field

The present disclosure relates to an information processing system, an information processing apparatus, and a server.

Background Art

An image forming apparatus acquires a print job from a personal computer (PC) or a server connected to a network and prints the acquired print job. The process in which the image forming apparatus prints the print job acquired by itself is referred to as "pull print" in the present disclosure.

By performing pull print, a user can select and print a print job from among multiple print jobs stored on all the PCs and servers connected to the network.

SUMMARY

Embodiments of the present disclosure describe an information processing system, an information processing apparatus, and a server. The information processing system includes an information processing apparatus and a server connected to the information processing apparatus through a network. The information processing apparatus generates a print job, stores the print job, and transmits the print job to the server. The server stores the print job received from the information processing apparatus, generates management information including information on print jobs stored on the information processing apparatus and information on print jobs stored on the server, and transmits the management information to a printing apparatus that executes printing based on the print job.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 4A and FIG. 4B are tables illustrating an example of a job list and an example of location information used in embodiments of the present disclosure;

FIG. 5A and FIG. 5B are tables illustrating examples of integrated lists used in embodiments of the present disclosure;

FIG. 6 is a flowchart illustrating a print job storage process included in the print job management process according to embodiments of the present disclosure;

Figure 1:
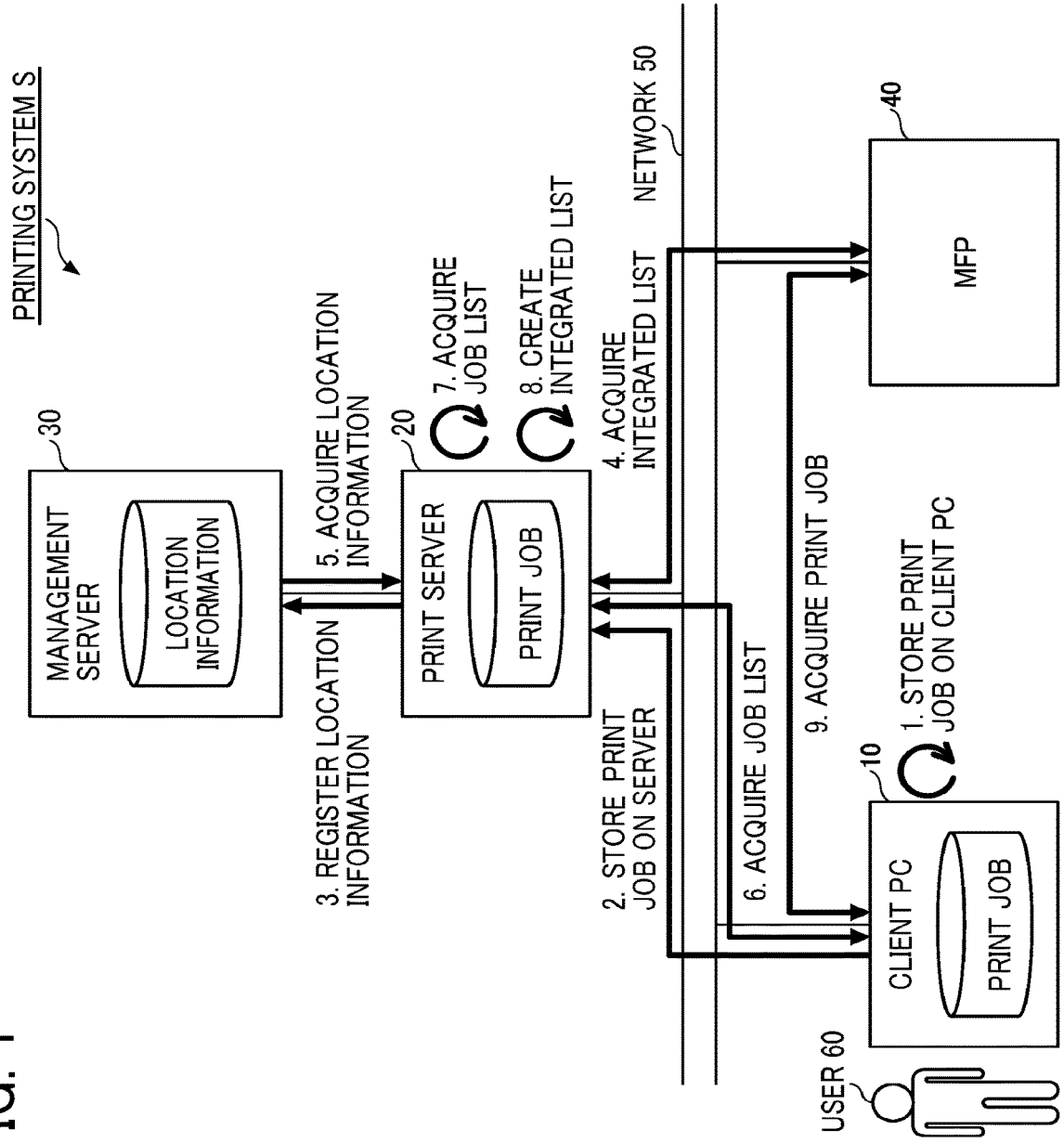
FIG. 1 is a block diagram illustrating an overall configuration of a printing system and information transmitted and received between apparatuses, according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Hereinafter, embodiments of the present disclosure are described in detail with reference to the drawings.

System Configuration

FIG. 1 is a block diagram illustrating an overall configuration of a printing system and information transmitted and received between apparatuses, according to embodiments of the present disclosure. As illustrated in FIG. 1, a printing system (information processing system) S includes a client PC 10, a print server 20, a management server 30, and an MFP 40. The respective apparatuses are communicably connected to each other through a network 50. The number of these apparatuses is not particularly limited, and the printing system S may include a plurality of apparatuses for each apparatus or server.

The client PC (information processing apparatus) 10 is a PC used by a user 60 to create a print job.

The print server 20 and the management server 30 are servers for implementing predetermined processes in the printing system S.

Further, the MFP (printing apparatus) 40 is an image forming apparatus having a function of performing pull printing.

The network 50 is implemented by, for example, any of the internet, a network such as a local area network (LAN), or a network combining the internet and the LAN. The communication method in the network 50 is not particularly limited, and each of these apparatuses can execute communication according to any communication method.

The printing system S having such a configuration executes the print job management process. Here, the print job management process is a series of processes for executing printing by appropriately managing a print job, even when some apparatuses are offline.

The outline of the print job management process is described together with the information transmitted and received between the apparatuses illustrated in FIG. 1.

1. Store Print Job on Client PC

First, the client PC 10 selects a print target file according to the operation of the user 60. Next, the client PC 10 creates a print job from the selected print target file. The print job is created including print data obtained by converting the print target file into a format that can be printed by the MFP 40 and print settings information when printing the print data.

The client PC 10 stores (spools) the created print job in a storage unit provided in the client PC 10.

2. Store Print Job on Server

The client PC 10 also stores the print job in a storage unit provided in the print server 20. In the present embodiment, the created print job is stored on both the storage unit provided in the client PC 10 and the storage unit provided in the print server 20.

3. Register Location Information

The print server 20 creates location information in which a user for each print job is associated with the apparatus in which each print job is stored. In the present embodiment, each print job can be managed for each user by the location information. The print server 20 registers the created location information in the management server 30.

4. Acquire Integrated List

When the user 60 performs pull printing, the MFP 40 requests the print server 20 to obtain an integrated list. The integrated list is a list created based on the location information including all print jobs stored on each client PC 10 and print server 20. In the present embodiment, the print server 20 and the MFP 40 manage all print jobs in the printing system S using the integrated list. The integrated list functions as management information (corresponding to "management information" in the present disclosure) of print jobs in the printing system S.

5. Acquire Location Information

The print server 20 acquires location information from the management server 30 to create the integrated list.

6. Acquire Job List

The print server 20 requests the client PC 10 in which print jobs are currently stored to obtain a job list, which is a list of print jobs stored on each apparatus, based on the location information. Then, the print server 20 acquires the job list of the client PC 10 in response to this request.

7. Acquire Job List

The print server 20 acquires a job list of print jobs stored on the print server 20 based on the location information.

8. Create Integrated List

The print server 20 creates an integrated list by integrating (i.e., merging) the job list of the client PC 10 and the job list of the print server 20. Then, the print server 20 transmits the integrated list to the MFP 40 of the request source. As a result, the MFP 40 acquires the integrated list. As described above, the integrated list includes management information for all the print jobs in the printing system S and information for the MFP 40 to acquire print jobs from the client PC 10 and print server 20 by communication (for example, address of the client PC 10 and the print server 20 storing the print job and the like).

9. Acquire Print Job

The MFP 40 displays the integrated list to the user 60. The user 60 selects a desired print job by referring to the display. The MFP 40 acquires a print job from the apparatus in which the selected print job is stored, based on the integrated list. As a result, printing of the print job desired by the user 60 can be executed.

The above is an outline of the print job management process. According to the print job management process, the created print job is stored not only on the client PC 10 but also on the print server 20. Therefore, even when the client PC 10 is off line for reasons such as a shutdown or network interruption, the MFP 40 can still obtain a print job from the print server 20. A problem in a general pull print technique can thereby be solved.

According to the present embodiment, convenience can be further improved with regard to the acquisition of a print job.

Further, when the same print job can be acquired from both the client PC 10 and the print server 20, the MFP 40 preferentially acquires the print job from the client PC 10. For example, when displaying the integrated list for the user, if the same print job can be obtained from both the client PC 10 and the print server 20, the MFP 40 displays only the print job of the client PC 10 and the print job of the server 20 is not displayed. Thus, the print job can be acquired from the client PC 10 with priority.

According to the present embodiment, since the print job is preferentially acquired from the client PC 10, concentration of access to the print server 20 for acquiring a print job and an increase in processing load on the print server 20 or congestion of a communication line with the print server 20 can be prevented. As a result, printing can be performed promptly.

From this viewpoint, it is possible to further improve convenience regarding the acquisition of the print job, according to the present embodiment.

Furthermore, when the client PC 10 is in the offline state, the job list from the client PC 10 cannot be acquired, so the integrated list does not include the print job of the client PC 10 (that is, the print job in the non-printable state). Therefore, it is possible to prevent the print job of the offline client PC 10 from being erroneously displayed to the user, when displaying the integrated list according to the present embodiment. In addition, for this reason, it is not necessary to monitor the state of each client PC 10 periodically.

From this viewpoint, it is possible to further improve convenience regarding the acquisition of the print job, according to the present embodiment.

Hardware Configuration

Figure 2:
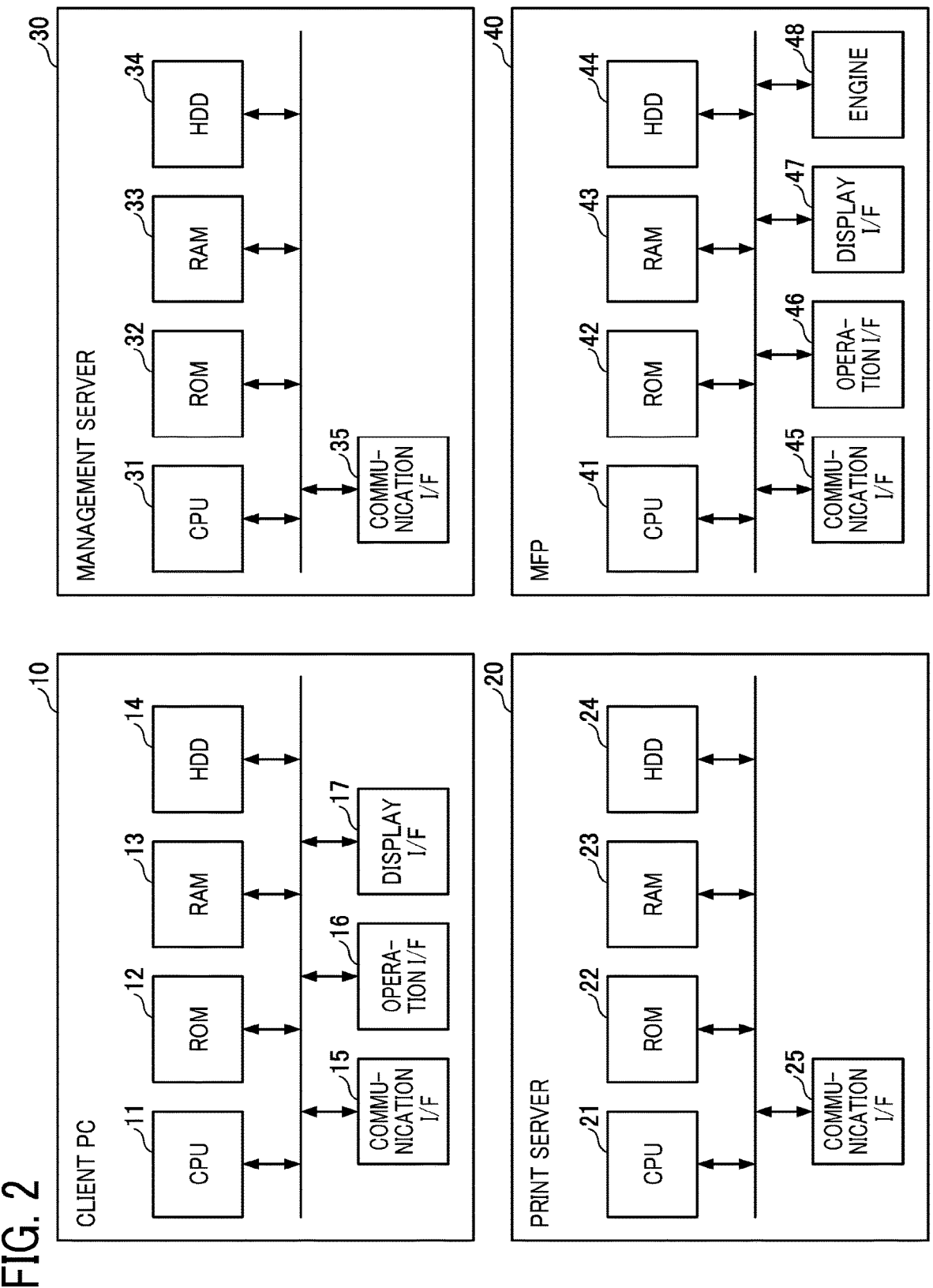
FIG. 2 is a block diagram illustrating a hardware configuration of each of a client personal computer (PC), a print server, a management server, and a multifunction peripheral (MFP) included in the printing system according to embodiments of the present disclosure.
Figure 3:
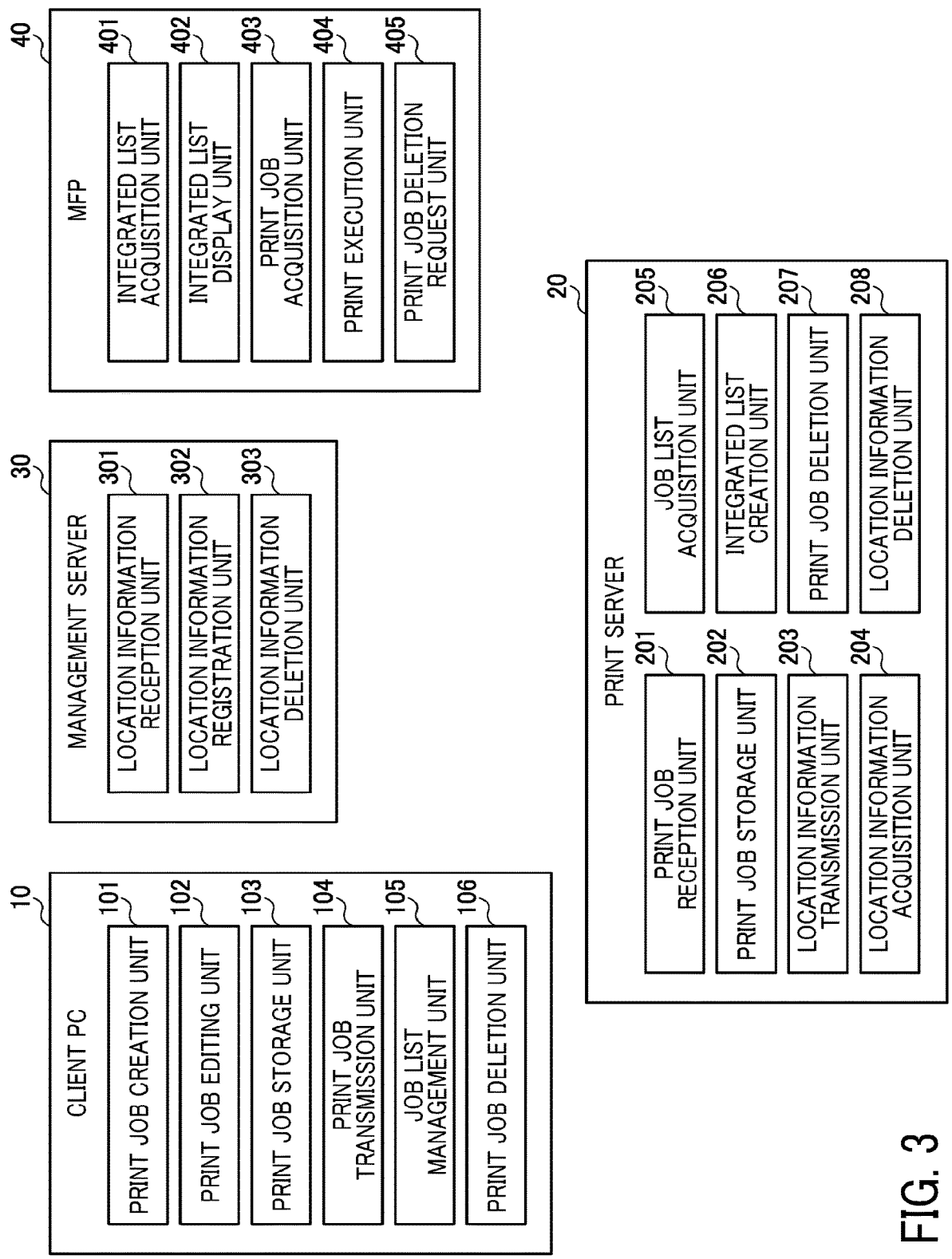
FIG. 3 is a block diagram illustrating a functional configuration for executing a print job management process by the client PC, the print server, the management server, and the MFP included in the printing system according to embodiments of the present disclosure.

A hardware configuration of each apparatus in the present embodiment is described with reference to FIG. 2. FIG. 2 is a block diagram illustrating the hardware configuration of each of the client PC 10, the print server 20, the management server 30, and the MFP 40, which are included in the printing system S. In FIG. 2 and FIG. 3 described below, for simplicity illustration of the network 50 to which these apparatuses are connected is omitted.

The client PC 10 includes a central processing unit (CPU) 11, a read only memory (ROM) 12, a random access memory (RAM) 13, a hard disk drive (HDD) 14, a communication interface (I/F) 15, an operation I/F 16, and a display I/F 17. These units are communicably connected to each other by a bus connection.

The CPU 11 controls the entire client PC 10. Specifically, the CPU 11 uses the RAM 13 as a work area and implements an operating system (OS) and operation processes based on various programs (for example, the print job management process described above) stored on the ROM 12 or the HDD 14. The CPU 11 controls each hardware included in client PC 10 based on a result of arithmetic processing.

The ROM 12 and the HDD 14 store the OS, various programs, and various data used in these programs (for example, print jobs and job lists used in the above-described print job management process).

The RAM 13 functions as the work area of the CPU 11 as described above.

The communication I/F 15 is an interface for the client PC 10 to communicate with each apparatus through the network 50.

The operation I/F 16 is an interface to which a device for receiving a user's operation is connected. For example, a mouse, a keyboard, or the like is connected to the operation I/F 16 as the device for receiving the user's operation. The operation I/F 16 outputs the content of the user's operation accepted by these devices to the CPU 11.

The display I/F 17 is an interface to which a device for displaying information to the user is connected. The display I/F 17 is an interface for connecting the device for displaying information (for example, a user interface for creating a print job, etc.) to the user, such as a liquid crystal display (LCD) or an organic electro luminescence display.

Note that these devices are examples, and other devices such as a touch panel may be connected to the operation I/F 16 and the display I/F 17, for example.

The print server 20 includes a CPU 21, a ROM 22, a RAM 23, an HDD 24, and a communication I/F 25. These units are communicably connected to each other by a bus connection.

The management server 30 includes a CPU 31, a ROM 32, a RAM 33, an HDD 34, and a communication I/F 35. These units are communicably connected to each other by a bus connection.

Further, the MFP 40 includes a CPU 41, a ROM 42, a RAM 43, an HDD 44, a communication I/F 45, an operation I/F 46, a display I/F 47, and an engine 48. These units are communicably connected to each other by a bus connection.

The hardware included in the print server 20, the management server 30, and the MFP 40 is hardware equivalent to the hardware of the client PC 10 having the same name but different in only the code. Therefore, redundant descriptions thereof are omitted.

The engine 48 is hardware that executes processes other than general-purpose information processing and communication for causing the MFP 40 to implement various functions such as a print function, a copy function, a scan function, and a facsimile function. The engine 48 includes hardware such as a scanner that scans and reads a document, a plotter that prints on a sheet material such as paper, and a facsimile unit that performs facsimile communication. In addition, the engine 48 may optionally include specific hardware such as a finisher for sorting printed sheet material and an automatic document feeder (ADF) for automatically feeding a document.

Functional Configuration

A functional configuration implemented by each hardware described above with reference to FIG. 2 is described with reference to FIG. 3. FIG. 3 is a functional block diagram illustrating the functional configuration for executing the print job management process among the functional configurations of the client PC 10, the print server 20, the management server 30, and the MFP 40 included in the printing system S.

In the functional blocks, each of the CPUs included in the client PC 10, the print server 20, the management server 30, and the MFP 40 (that is, the CPU 11, the CPU 21, the CPU 31, and the CPU 41) implements the print job management process by controlling each hardware included in each apparatus based on a program.

When the print job management process is executed, a print job creation unit 101, a print job editing unit 102, a print job storage unit 103, a print job transmission unit 104, a job list management unit 105, and a print job deletion unit 106 function in the client PC 10 as illustrated in FIG. 3.

The print job creation unit 101 creates a print job. As described above, the print job is created including print data obtained by converting the print target file into a format that can be printed by the MFP 40 and print settings information to be used when printing the print data.

The print target file is, for example, an image or text file conforming to a format such as Portable Document Format (PDF) or Joint Photographic Experts Group (JPEG), a document file created by document creation software, or the like. The print settings information is settings information such as, for example, size and type of a sheet for printing, resolution in printing, designation as to whether to perform black and white printing or color printing, and a need for stapling printed sheets.

The print job editing unit 102 edits user authentication information and the like included in the print job as necessary.

The print job storage unit (apparatus side storage unit) 103 stores print jobs created by the print job creation unit 101 and edited by the print job editing unit 102 as needed. For example, the print job storage unit 103 stores the print job by storing the print job in the HDD 14.

The print job transmission unit (apparatus side transmission unit) 104 transmits the print job to the print server 20 in order to store the print job in the print server 20 as well.

The job list management unit 105 stores and manages a job list, which is a list of print jobs created by the print job creation unit 101 and stored on the client PC 10, in a storage device such as the HDD 14, for example. For example, the job list management unit 105 updates the job list stored on the storage device each time the print job creation unit 101 creates a print job or the print job deletion unit 106 described below deletes a print job. Further, the job list management unit 105 acquires the job list by reading the job list from the storage device.

Here, the job list is described with reference to FIG. 4A. FIG. 4A is a table illustrating an example of the job list. In the example of FIG. 4A, the job list 410 includes "job ID" assigned to identify each print job, "user ID" assigned to identify each user, "job information" indicating the settings information of the print job and "file path" indicating the storage location of the print job (for example, a path of a file corresponding to the print job in the HDD 14) are stored in the table in association with each other. The job list enables management of each print job stored on the client PC 10.

Returning to FIG. 3, the print job deletion unit 106 deletes the print job. For example, when printing of a print job is executed by the MFP 40, the print job deletion unit 106 deletes the printed print job in response to the print job deletion request sent from the MFP 40.

When the print job management process is executed, a print job reception unit 201, a print job storage unit 202, a location information transmission unit 203, a location information acquisition unit 204, a job list acquisition unit 205, an integrated list creation unit 206, a print job deletion unit 207, and a location information deletion unit 208 function in the print server 20, as illustrated in FIG. 3.

The print job reception unit 201 receives the print job transmitted from the print job transmission unit 104 to the print server 20.

The print job storage unit (server side storage unit) 202 stores the print job received by the print job reception unit 201. For example, the print job storage unit 202 stores the print job by storing the print job in the HDD 24.

The location information transmission unit 203 creates location information and sends the created location information to the management server 30. For example, when a print job for a given user is newly stored, the location information transmission unit 203 adds the location information for the certain user to the location information. Then, the location information transmission unit 203 transmits the location information to the management server 30. On the other hand, when all print jobs for a given user are deleted, the location information deletion unit 208 described below deletes the location information for the certain user from the location information.

The location information is described below with reference to FIG. 4B. FIG. 4B is a table illustrating an example of the location information. In the example of FIG. 4B, the location information 420 includes "location ID" assigned to identify each location (both the client PC 10 and the print server 20), "type" indicating the type corresponding to each location (the client PC 10 or the print server 20), "user ID" assigned to identify each user, "protocol" indicating the type of protocol to communicate with each location, "port" indicating the communication port number for communicating with each location, and "address" which indicates the address for communication with each location are associated with each location and stored in the table. The location information enables management of the location of each user's print job.

The combination of the user and the location in the location information is determined based on, for example, the settings of the user who uses the client PC 10 or the settings of the administrator who manages the print server 20.

Returning to FIG. 3, the location information acquisition unit 204 transmits an acquisition request for location information currently registered to the management server 30 and acquires location information currently registered as a response.

The job list acquisition unit 205 transmits a job list acquisition request to the client PC 10 and acquires the job list of the client PC 10 as a response.

Further, the job list acquisition unit 205 acquires the job list of the print server 20 by reading the job list from the storage device. The job list of the print server 20 is stored, for example, in the HDD 24 and is updated with the latest contents each time the print job reception unit 201 receives a print job and the print job deletion unit 207 described below deletes a print job.

The integrated list creation unit (management information generation unit) 206 integrates (i.e., merges) the job list of the client PC 10 and the job list of the print server 20.

Preferably, the integrated list creation unit 206 handles the location information and the list in which the job lists are integrated as information of a relational database combined (that is, related) by the user ID.

Preferably, the integrated list creation unit 206 creates an integrated list in which all print jobs are associated with information (information such as protocol, port, and address) for communication with the client PC 10 and print server 20 in which print jobs are stored, based on information obtained by combining the list obtained by integrating the job lists with the location information. Then, the integrated list creation unit 206 transmits the created integrated list to the MFP 40 of the request source. By using this integrated list as management information, it is possible to manage all print jobs, users corresponding to all print jobs, and locations corresponding to all print jobs. That is, as described above with reference to FIG. 1, the integrated list functions as management information of print jobs in the printing system S.

The integrated list is described below with reference to FIG. 5A and FIG. 5B. FIG. 5A and FIG. 5B are tables illustrating examples of the integrated list. FIG. 5A illustrates an example of the integrated list 501 corresponding to the user with the user ID "2" that the integrated list creation unit 206 created based on the job list 410 illustrated in FIG. 4A and the location information 420 illustrated in FIG. 4B. As illustrated in FIG. 5A, in the integrated list 501 created by the integrated list creation unit 206, information of print jobs stored on the client PC 10 (for example, job ID, job information, document name, print job, etc.) and print job information stored on the print server 20 are included.

Preferably, as illustrated in FIG. 5A, the integrated list 501 includes information (for example, type, location, etc.) of the client PC 10 and the print server 20 for storing print jobs. The integrated list created by the integrated list creation unit 206 is an example of management information and includes information on print jobs stored on the print job storage unit 103 of the client PC 10 and print job information stored on the print job storage unit 202 of the print server 20.

An example of the integrated list 501 corresponding to the user with the user ID "1" which the integrated list creation unit 206 created from the job list 410 illustrated in FIG. 4A and the location information 420 illustrated in FIG. 4B is illustrated in FIG. 5B. In the example of FIG. 5B, the print job corresponding to the user is stored only in the print server 20.

Returning to FIG. 3, the description of the functional configuration of the print server 20 is continued. For example, when printing of a print job is executed by the MFP 40, the print job deletion unit 207 deletes the printed print job in response to the print job deletion request transmitted from the MFP 40. For example, the print job deletion unit 207 deletes the print job requested by the print job deletion request among the print jobs stored on the HDD 24 by the print job storage unit 202.

When all print jobs for a given user are deleted, the location information deletion unit 208 deletes location information for the certain user from the location information. In addition, the location information deletion unit 208 report to the management server 30, that the location information for this certain user has been deleted.

In the management server 30, a location information reception unit 301, a location information registration unit 302, and a location information deletion unit 303 function when the print job management process is executed as illustrated in FIG. 3.

The location information reception unit 301 receives the location information transmitted from the location information transmission unit 203.

The location information registration unit 302 registers the location information received by the location information reception unit 301. For example, the location information registration unit 302 stores the location information by storing the location information in the HDD 34.

When the location information deletion unit 303 receives from the location information deletion unit 208 that location information for a given user has been deleted, the location information deletion unit 303 deletes the location information for the certain user from the registered location information.

When the print job management process is executed, an integrated list acquisition unit 401, an integrated list display unit 402, a print job acquisition unit 403, a print execution unit 404, and a print job deletion request unit 405 function in the MFP 40 as illustrated in FIG. 3.

The integrated list acquisition unit 401 transmits an integrated list acquisition request to the print server 20 and acquires a current integrated list as a response.

The integrated list display unit 402 displays the print job included in the integrated list acquired by the integrated list acquisition unit 401 to the user. The user can select a print job for printing by referring to this display.

The print job acquisition unit 403 acquires a print job when the user who referred to the display by the integrated list display unit 402 selects a print job to be printed. Information for performing communication with an apparatus to acquire a print job is included in the integrated list as described above in the description of the integrated list creation unit 206.

The print execution unit 404 executes printing of the print job acquired by the print job acquisition unit 403.

When printing is executed by the print execution unit 404, the print job deletion request unit 405 transmits a corresponding print job deletion request to the client PC 10 or the print server 20. The print job deletion unit 207 and the print job deletion unit 106 can delete the print job for which printing has been performed based on the deletion request. Note that deletion of the print job may be performed not when printing is executed but when receiving a deletion operation of the print job from the user.

Operation

The print job management process according to this embodiment is described below. Note that each functional block described above with reference to FIG. 3 appropriately executes the process for the print job management process, even if not specifically mentioned in the following description.

Print Job Storage Process

FIG. 6 is a flowchart illustrating a print job storage process included in the print job management process. The print job storage process is executed when the user instructs to create a print job in the client PC 10.

In step S11, the print job creation unit 101 creates a print job.

In step S12, the print job storage unit 103 stores the print job created in step S11 on the client PC 10.

In step S13, the print job storage unit 202 stores in the print server 20, the print job created in step S11 and received by the print job reception unit 201.

In step S14, the location information registration unit 302 registers, in the management server 30, the location information that has been updated by the storage in step S12 and step S13 and received by the location information reception unit 301.

As a result, the print job storage process is completed, and storage of print jobs and registration of corresponding location information are performed.

Integrated List Creation Process

Figure 7:
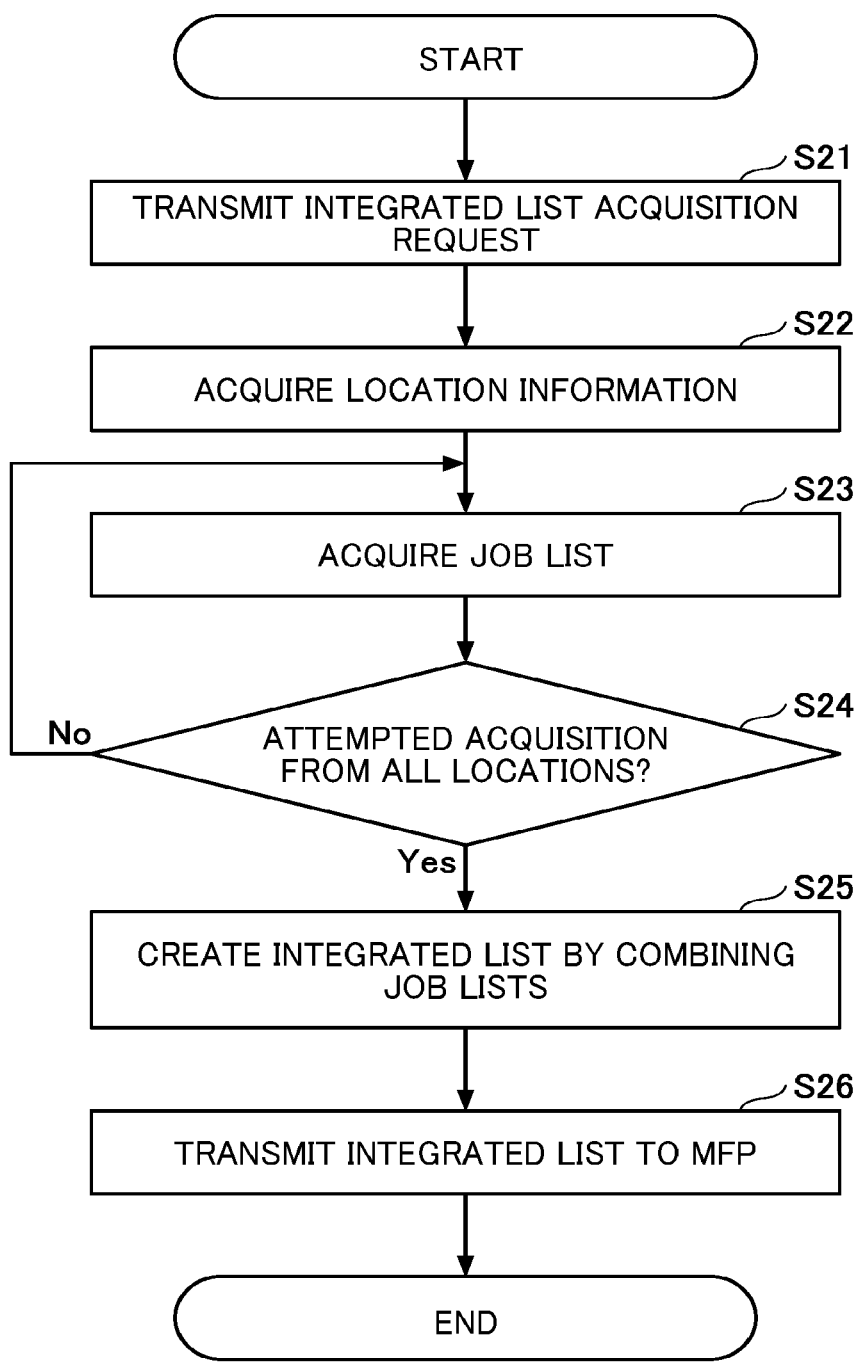
FIG. 7 is a flowchart illustrating an integrated list creation process included in the print job management process according to embodiments of the present disclosure.

FIG. 7 is a flowchart illustrating an integrated list creation process included in the print job management process. The integrated list creation process is executed when the user issues a print execution instruction for a print job in the MFP 40.

In step S21, the integrated list display unit 402 transmits an integrated list acquisition request to the print server 20.

In step S22, the location information acquisition unit 204 acquires location information from the management server 30.

In step S23, the job list acquisition unit 205 acquires a job list from any location (that is, any client PC 10 or print server 20) included in the location information acquired in step S22. When the client PC 10 is offline, the job list is not transmitted from the client PC 10.

In step S24, the job list acquisition unit 205 determines whether acquisition of the job list has been attempted from all the locations included in the location information. Here, "attempted" includes a case where the job list is requested when the client PC 10 is offline and the job list cannot be acquired as a response.

When acquisition of the job list is attempted from all the locations, determination is Yes in step S24, and the process proceeds to step S25. On the other hand, if there is a location for which acquisition of the job list has not been attempted yet, determination is No in step S24, and step S23 is repeated for other locations.

In step S25, the integrated list creation unit 206 creates an integrated list, which is management information, based on all the job lists acquired in the repetition of step S23.

In step S26, the integrated list creation unit 206 transmits the integrated list created in step S25 to the MFP 40.

As a result, the integrated list creation process completes, and the MFP 40 can print the print job desired by the user.

Figure 8:
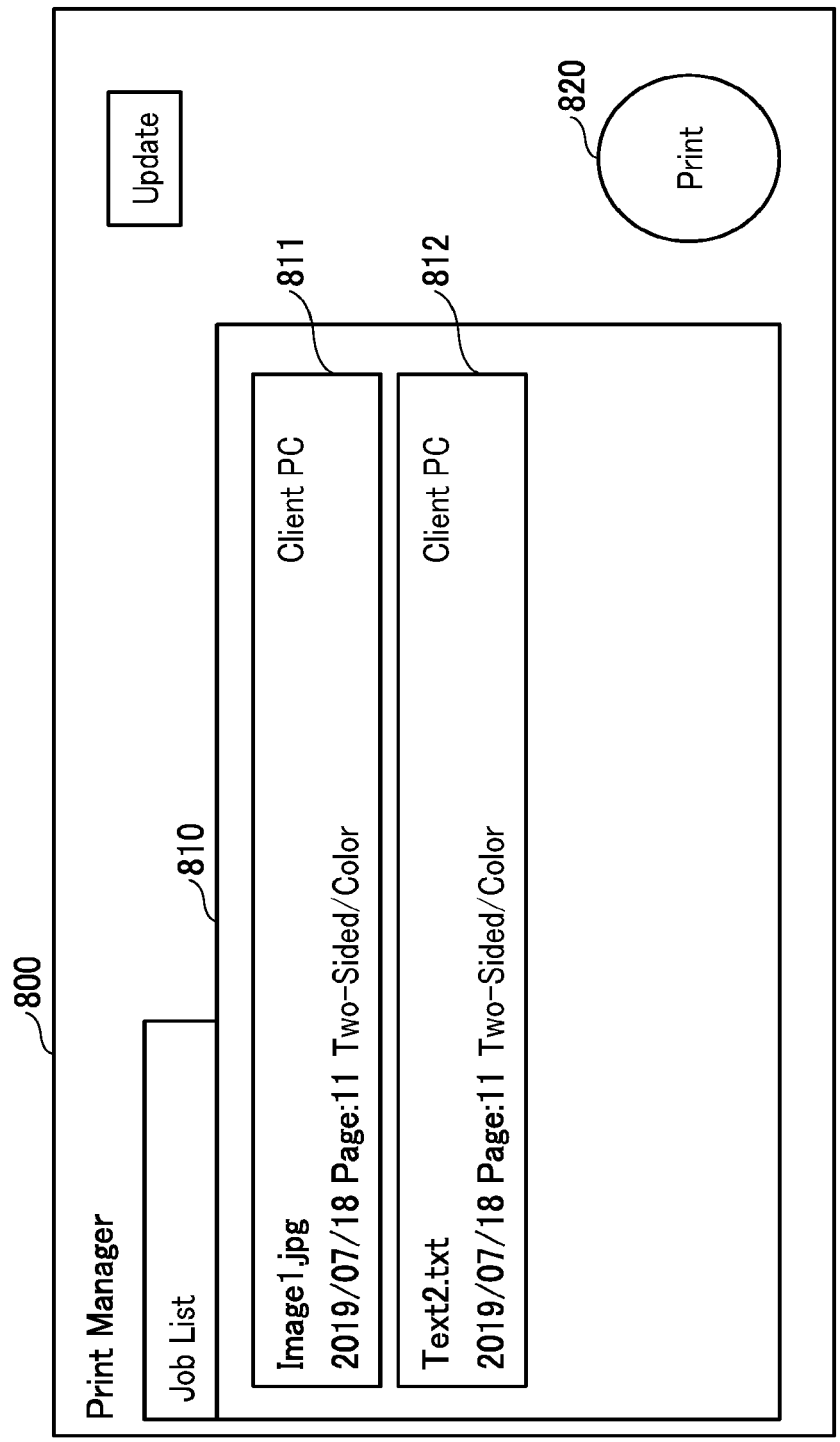
FIG. 8 is a diagram illustrating an example of an operation screen displayed by an integrated list display unit according to embodiments of the present disclosure.

FIG. 8 illustrates an example of the operation screen displayed by the integrated list display unit 402 of the MFP 40. The integrated list display unit 402 displays, for example, an operation screen 800 as illustrated in FIG. 8 based on the integrated list acquired by the integrated list acquisition unit 401 from the print server 20. In the job list 810 of the operation screen 800 illustrated in FIG. 8, information 811 and 812 of print jobs corresponding to job IDs "2" and "3" included in the integrated list 501 of FIG. 5A are displayed as selectable items. For example, the user can execute the print job for printing "Image1.jpg" by selecting the print job information 811 and selecting the "print" button 820.

First Print Job Deletion Process

Figure 9:
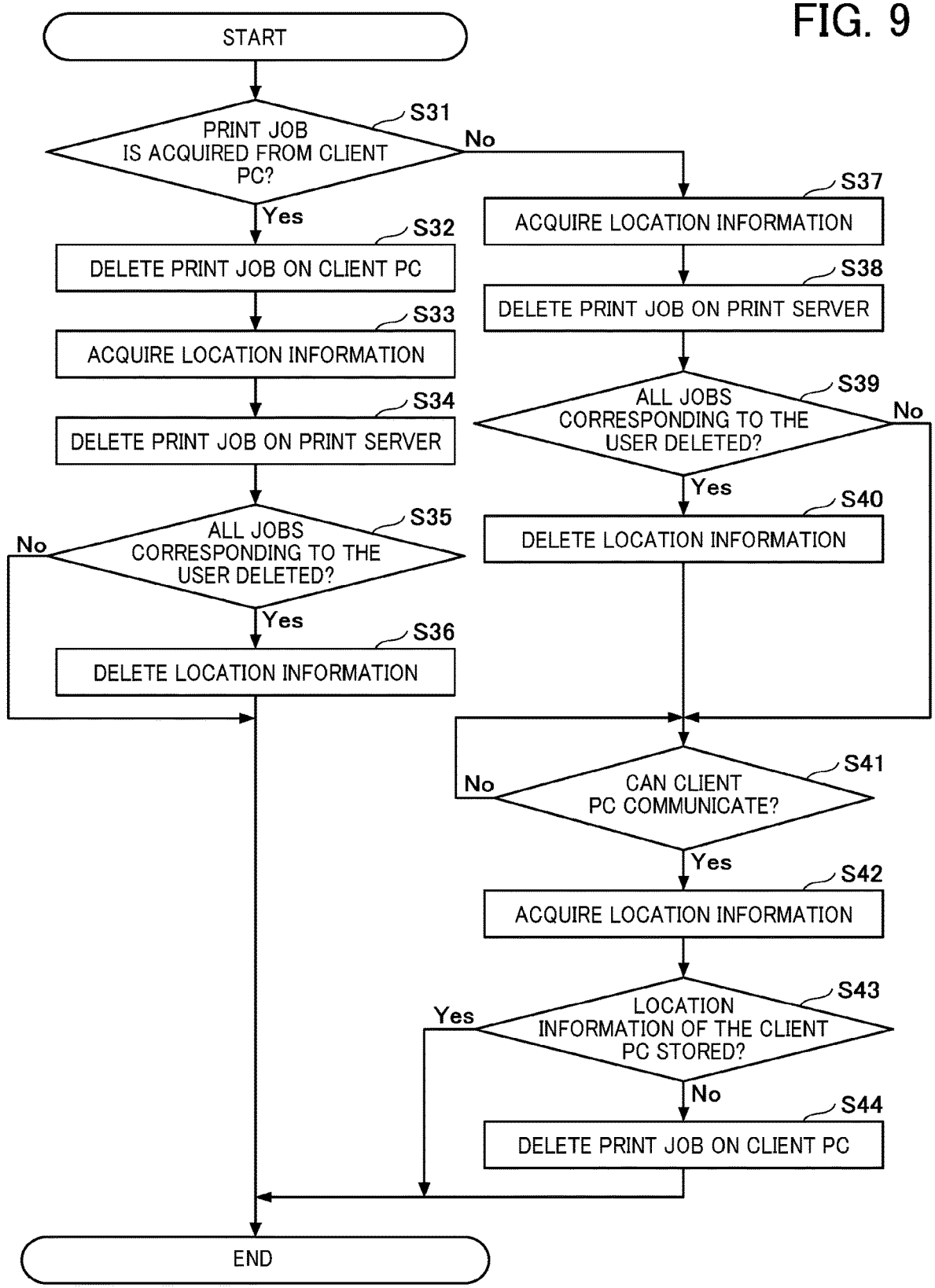
FIG. 9 is a flowchart illustrating a first example of a print job deletion process included in the print job management process according to embodiments of the present disclosure.

FIG. 9 is a flowchart illustrating a first example of a print job deletion process included in the print job management process. The print job deletion process is executed when a print job is executed in the WP 40.

In step S31, the print job deletion request unit 405 determines whether the executed print job is acquired from the client PC 10. If the print job is acquired from the client PC 10, determination is Yes in step S31, and the process proceeds to step S32. On the other hand, if the print job is acquired from the print server 20 because the client PC 10 is offline or the like, determination is No in step S31, and the process proceeds to step S37.

In step S32, the print job deletion request unit 405 transmits, to the print job deletion unit 106 and the print job deletion unit 207, a deletion request for the executed print job. In response to the deletion request, the print job deletion unit 106 deletes the executed print job.

In step S33, the location information acquisition unit 204 acquires the location information from the management server 30 in response to the print job deletion request received in step S32.

In step S34, the print job deletion unit 207 deletes the executed print job from the print server 20 other than the client PC 10 based on the location information acquired in step S33.

In step S35, the location information deletion unit 208 determines, based on the location information, whether all print jobs of the user for the executed print job have been deleted. This is because location information is managed on a user basis in the present embodiment. If all print jobs of the corresponding user have been deleted, determination is Yes in step S35, and the process proceeds to step S36. On the other hand, if all print jobs of the corresponding user have not been deleted, determination is No in step S35, and the print job deletion process is completed.

In step S36, the location information deletion unit 208 transmits a deletion request for the location information of the corresponding user to the location information deletion unit 303. In response to the deletion request, the location information deletion unit 303 deletes the location information of the corresponding user. Then, the print job deletion process is completed. As described above, since the determination in step S35 and the deletion of the location information in step S36 are performed, not only the print job can be deleted along with the execution of the printing, but also the location information can be managed appropriately.

On the other hand, in step S37, the print job deletion request unit 405 transmits a deletion request for the executed print job to the print job deletion unit 207. However, since the determination in step S31 is No, the client PC 10 is in the offline state. Therefore, the print job deletion request unit 405 does not transmit the deletion request to the print job deletion unit 106. The location information acquisition unit 204 acquires location information from the management server 30 in response to the print job deletion request sent from the print job deletion request unit 405.

In step S38, the print job deletion unit 207 deletes the executed print job on the print server 20, based on the acquired location information.

In step S39, the location information deletion unit 208 determines whether all print jobs of the user for the executed print job have been deleted based on the location information. The executed print job is stored on the client PC 10 at this point in time, but the executed print job is deleted by the subsequent processing. Therefore, the location information deletion unit 208 determines that the executed print job is deleted from the client PC 10, and then performs the determination in step S39. If all print jobs of the corresponding user have been deleted, determination is Yes in step S39, and the process proceeds to step S40. On the other hand, if all print jobs of the corresponding user have not been deleted, determination is No in step S39, and the process proceeds to step S41.

In step S40, the location information deletion unit 208 transmits a deletion request for the location information of the corresponding user to the location information deletion unit 303. In response to the deletion request, the location information deletion unit 303 deletes the location information of the corresponding user.

In step S41, the print job deletion unit 106 determines whether the client PC 10 is in the online state from the offline state and communication is possible. For example, when the client PC 10 is restarted, or when communication becomes possible due to recovery of a network failure or the like, determination is Yes in step S41, and the process proceeds to step S41. On the other hand, when communication is not possible, determination is No in step S41, and the process repeats the determination of step S41.

In step S42, the print job deletion unit 106 acquires location information from the management server 30 through the print server 20.

In step S43, the print job deletion unit 106 determines whether the location information of the client PC 10 is stored for each print job currently stored on the client PC 10.

When the location information is stored, determination is Yes in step S43, and the print job deletion process is completed. Above description is a case where the process of step S40 is not performed while the client PC 10 is offline.

On the other hand, if the location information is not stored, determination is No in step S43, and the process proceeds to step S44. Above description is the case where the process of step S40 is performed while the client PC 10 is offline.

In step S44, the print job deletion unit 106 deletes the print job stored on the client PC 10 and in which the location information of the client PC 10 is not stored. Then, the print job deletion process is completed. As described above, since the determination in step S39 and step S43, the deletion of the location information in step S36, and the deletion of the print job in step S44 are performed, not only the print job can be deleted along with the execution of printing, but the location information can be managed at the same time as well.

Second Print Job Deletion Process

Figure 10:
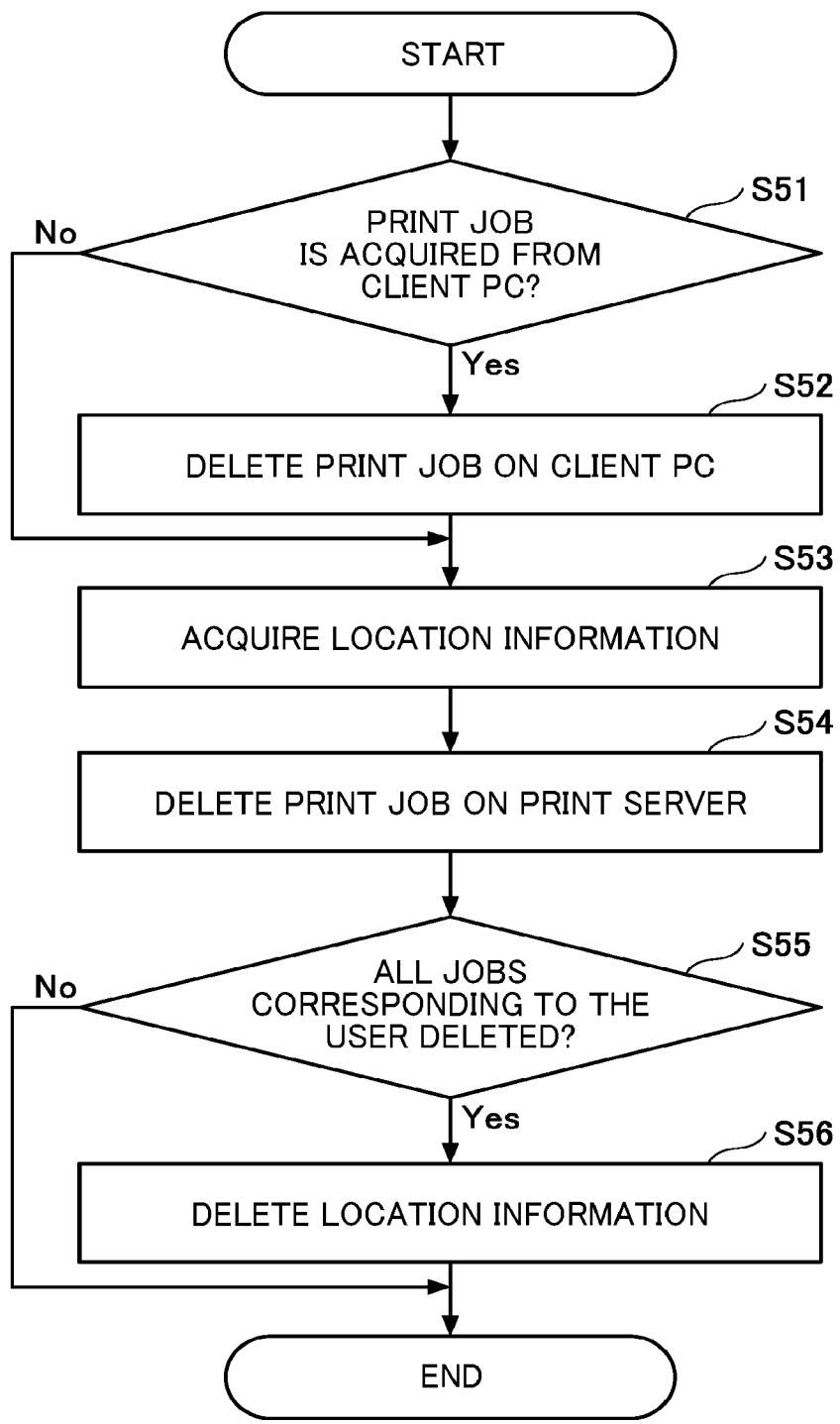
FIG. 10 is a flowchart illustrating a second example of the print job deletion process included in the print job management process according to embodiments of the present disclosure.
Figure 11:
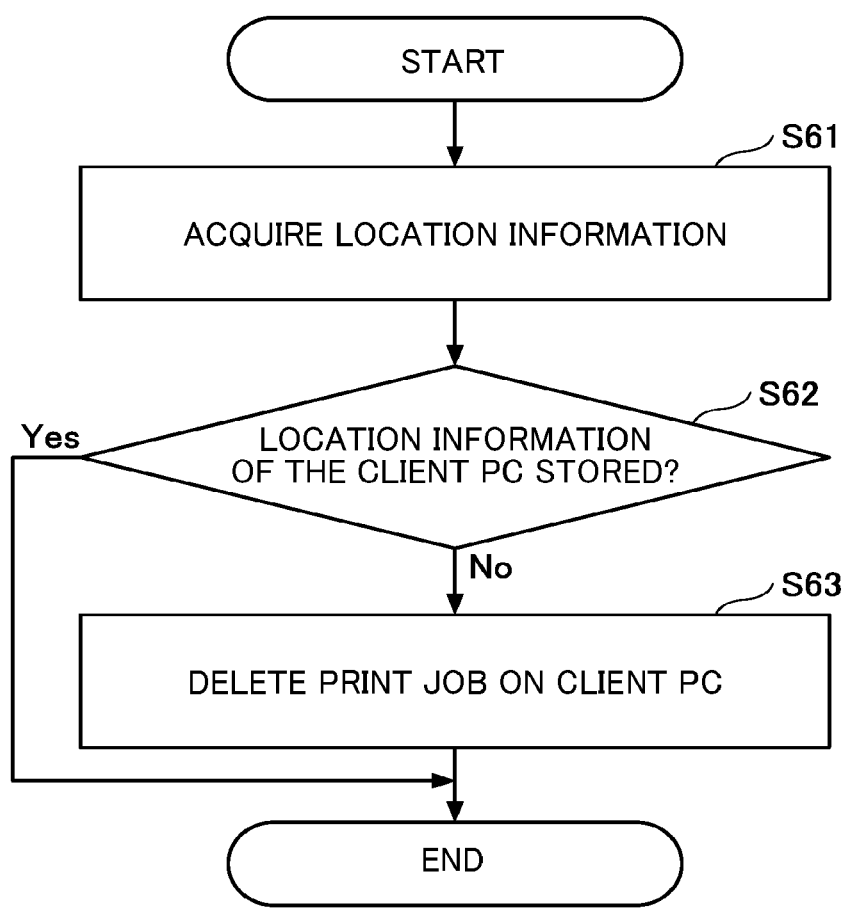
FIG. 11 is a flowchart illustrating a third example of the print job deletion process included in the print job management process according to embodiments of the present disclosure.

FIG. 10 and FIG. 11 are flowcharts illustrating other examples of the print job deletion process, which is a process included in the print job management process. The print job deletion process is executed, for example, when a print job is executed in the MFP 40. The basic processing content is the same as the first print job deletion process described with reference to FIG. 9, and thus a detailed description of the same process is omitted here.

In step S51, the print job deletion request unit 405 of the MFP 40 determines whether the executed print job is acquired from the client PC 10. When the print job is acquired from the client PC 10, determination is Yes in step S51, and the process proceeds to step S52. On the other hand, when the print job is acquired from the print server 20, determination is No in step S51, and the process proceeds to step S53.

In step S52, the print job deletion request unit 405 of the MFP 40 transmits a deletion request for the executed print job to the print job deletion unit 106 and the print job deletion unit 207. In response to the deletion request, the print job deletion unit 106 of the client PC 10 deletes the executed print job.

In step S53, the location information acquisition unit 204 of the print server 20 acquires location information from the management server 30 in response to the print job deletion request received from the print job deletion request unit 405 of the MFP 40.

In step S54, the print job deletion unit 207 of the print server 20 deletes the executed print job from the print server 20 based on the location information acquired by the location information acquisition unit 204.

In step S55, the location information deletion unit 208 of the print server 20 determines, based on the location information, whether all print jobs of the user for the executed print job have been deleted. If all print jobs of the corresponding user have been deleted, determination is Yes in step S55, and the process proceeds to step S56. On the other hand, if all the print jobs of the corresponding user have not been deleted, determination is No in step S55, and the print job deletion process is complete.

In step S56, the location information deletion unit 208 of the print server 20 transmits, to the location information deletion unit 303 of the management server 30, a deletion request for the location information of the corresponding user. In response to the deletion request, the location information deletion unit 303 of the management server 30 deletes the location information of the corresponding user. Then, the print job deletion process is completed.

However, in the above process, for example, when the print job is acquired from the print server 20 because the client PC 10 is offline or the like, the executed print job remains stored on the client PC 10. Therefore, the client PC 10 executes the print job deletion process at startup as illustrated in FIG. 11, for example.

In step S61, the print job deletion unit 106 of the client PC 10 acquires location information from the management server 30 through the print server 20.

In step S62, the print job deletion unit 106 of the client PC 10 determines, for each print job currently stored on the client PC 10, whether the location information of the client PC 10 is stored.

When the location information is stored, then the determination is Yes in step S62, and the print job deletion process is completed. The description is a case where the process of step S56 of FIG. 10 is not performed while the client PC 10 is offline. On the other hand, when the location information is not stored, determination is No in step S62, and the process proceeds to step S63. The description is of the case where the process of step S56 of FIG. 10 is performed while the client PC 10 is offline.

In step S63, the print job deletion unit 106 of the client PC 10 deletes the print job stored on the client PC 10 and in which the location information of the client PC 10 is not stored. Then, the print job deletion process is completed.

By the processes illustrated in FIG. 10 and FIG. 11, not only the print job can be deleted along with the execution of printing, but also the location information can be managed appropriately.

The print job management process is executed by the operation described above. The effects of the print job management process are as described above with reference to FIG. 1.

Variation

The present disclosure is not limited to the above-described embodiment, and modifications, improvements, and the like within the scope in which the object of the present disclosure can be achieved are included in the present disclosure.

First Variation

For example, the entire configuration illustrated in FIG. 1 is merely an example, and, for example, two or more client PCs 10 and two or more MFPs 40 may be included. Even in this case, by using the above-described location information, it is possible to appropriately manage print jobs stored on each apparatus.

In addition, for example, two or more print servers 20 may be included. In this case, the same print job can be stored on the client PC 10 and each of the two or more print servers 20 in a redundant configuration. As a result, even if any print server 20 in addition to the client PC 10 goes offline, it is possible to obtain a print job from other print servers 20 and execute printing.

Furthermore, for example, functions of the print server 20 and the management server 30 may be implemented by one server.

In addition, for example, the functions of the print server 20 and the management server 30 may be implemented by a plurality of servers. For example, the functions of the print server 20 may be implemented using online storage provided on a cloud, which is implemented by a plurality of cloud servers.

Further, for example, in the above-described embodiment, the MFP 40 has been described as an MFP having a copy function, a print function, a scan function, and a facsimile function, but the present disclosure is not limited to this description. The MFP 40 may be any image forming apparatus that executes pull printing and may not necessarily have the scan function and the facsimile function. Alternatively, other functions may be provided.

Second Variation

In the above-described embodiment, the integrated list display unit 402 displays the print jobs of all users based on the integrated list. Then, printing is executed by the print job selected from the print jobs of all the users. The present disclosure is not limited to this description, however, and thus, for example, print jobs of only some users may be displayed. Then, printing may be executed by a print job selected from the print jobs of some of the users. In this case, for example, the MFP 40 identifies the user by authenticating the user. Then, only the print job(s) of the identified user may be displayed, or only the print job(s) of the user related to the identified user (for example, a user in the same department) may be displayed.

Third Variation

In the above-described embodiment, each print job is managed on a user basis. Not limited to this, print jobs may be managed in other units. For example, each print job may be managed in print job units. As a result, although the amount of data of location information increases, but it becomes possible to associate a different client PC 10 as a location for each print job for one user. Thereby, even when one user uses a plurality of client PCs 10, it becomes possible to apply the above-described embodiment.

Other Variations

The series of processes described above can be performed by hardware or software. In other words, the functional configuration of FIG. 3 is merely an example and is not particularly limited. That is, it is sufficient that each apparatus included in the printing system S has a function capable of executing the above-described series of processes as a whole. The functional configuration is not limited to the examples described.

Further, one functional block may be configured by hardware alone, may be configured by software alone, or may be configured by a combination of hardware and software. For example, the functional configuration in the present embodiment is implemented by a processor that executes arithmetic processing.

Processors that can be used in the present embodiment include various processing devices such as a single processor, a multiprocessor, and a multicore processor. In addition, a combination of these various processing devices and a processing circuit such as an application specific integrated circuit (ASIC) or a field-programmable gate array (FPGA) is included.

When a series of processes is executed by software, a program constituting the software is installed on a computer or the like from a network or a storage medium. The computer may be a computer incorporated in dedicated hardware. The computer may be a computer capable of executing various functions by installing various programs, for example, a general-purpose personal computer.

A storage medium including such a program is provided to the user not only by removable media distributed separately from the apparatus, but also provided to the user in a state of being incorporated in the apparatus. The removable medium includes, for example, a magnetic disk (including a floppy disk), an optical disk, or a magneto-optical disk.

The optical disc includes, for example, a Compact Disk-Read Only Memory (CD-ROM), a Digital Versatile Disk (DVD), a Blu-ray (registered trademark) Disc, or the like. The magneto-optical disk includes a Mini-Disk (MD) or the like. In addition, the storage medium provided to the user in a state of being incorporated in the apparatus includes, for example, the ROM 12, ROM 22, ROM 32 and ROM 42, HDD 14, HDD 24, HDD 34, and HDD 44 of FIG. 2 storing program.

In the present disclosure, the steps described in the program stored on the storage medium include in addition to the steps performed chronologically along the order, also processes executed in parallel or individually. Also, in the present disclosure, the term "system" is intended to describe an overall apparatus composed of a plurality of apparatuses, a plurality of units and the like.

While some embodiments of the present disclosure have been described above, these embodiments are merely illustrative and do not limit the technical scope of the present disclosure. The present disclosure can take other various embodiments, and furthermore, various changes such as omissions and substitutions can be made without departing from the scope of the present disclosure. These embodiments and modifications thereof are included in the scope of the present disclosure, and are included in the in the claims and the equivalent scope thereof.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

What is claimed is:

1. An information processing system, comprising:
an information processing apparatus; and
a server connected to the information processing apparatus through a network,
the information processing apparatus including first processing circuitry configured to:
   generate a print job;
   store the print job in a first memory;
   add the print job to a first job list maintained by the information processing apparatus; and
   transmit the print job to the server;
the server including second processing circuitry configured to:
   store the print job received from the information processing apparatus in a second memory so that the print job is stored both in the first memory and the second memory at a same time;
   add the print job to a second job list maintained by the server;
   generate management information including information on all print jobs stored on the information processing apparatus and information on all print jobs stored on the server by acquiring the first job list maintained by the information processing apparatus, and then merging the first and second job lists to generate an integrated list included in the management information, wherein a same print job can be listed twice on the integrated list; and
   transmit the generated management information to a printing apparatus that executes printing based on one of the print jobs on the integrated list.

2. The information processing system of claim 1, wherein the management information includes location information of the information processing apparatus that stores the print job and location information of the server that stores the print job.

3. The information processing system of claim 1, wherein the management information includes information for acquiring the print job by communication from the information processing apparatus that stores the print job and the server that stores the print job.

4. The information processing system of claim 1, wherein when the printing apparatus executes printing based on the print job, the first processing circuitry and the second processing circuitry delete the executed print job from the first and second job lists, respectively.

5. The information processing system of claim 1, wherein when the printing apparatus acquires a particular print job on the integrated list stored by the first processing circuitry and executes printing based on the particular print job, the first processing circuitry is further configured to:
   delete the particular print job from the first job list; and
   transmit a deletion request for the particular print job to the second processing circuitry; and
the second processing circuitry is further configured to delete the particular print job from the second job list based on the deletion request received from the first processing circuitry.

6. The information processing system of claim 1, wherein when the printing apparatus acquires a particular print job on the integrated list stored by the second processing circuitry and executes printing based on the particular print job, the second processing circuitry is further configured to:

delete the particular print job from the second job list; and reflect deletion of the particular print job in the management information; and when the first processing circuitry confirms the management information reflecting the deletion of the particular print job, the first processing circuitry is further configured to delete the particular print job from the first job list.

7. The information processing system of claim 1, further comprising the printing apparatus, wherein when the information processing apparatus and the server respectively store a same particular print job on the integrated list, the printing apparatus attempts to acquire the particular print job from the information processing apparatus, and acquires the particular print job from the server when the particular print job cannot be acquired from the information processing apparatus.

8. The information processing system of claim 1, further comprising another server comprising circuitry configured to store the print job stored by the first processing circuitry.

9. The information processing system of claim 1, further comprising a management server configured to maintain location information, which includes a list of all devices storing print jobs and maintaining a job list, and send the location information to the second processing circuitry upon request, wherein the second processing circuitry generates the integrated list by using the location information received from the management server.

10. A server, comprising:

processing circuitry configured to:

store, in a memory, a print job received from an information processing apparatus that creates and stores the print job locally so that the print job is stored both in the memory of the server and in the information processing apparatus at a same time;

add the print job to a second job list maintained by the server;

generate management information including print job information on all print jobs stored in a first job list on the information processing apparatus and print job information of all print jobs stored in the second job list on the server by acquiring the first job list maintained by the information processing apparatus, and then merging the first and second job lists to generate an integrated list included in the management information, wherein a same print job can be listed twice on the integrated list; and transmit the generated management information to a printing apparatus that executes printing based on one of the punt jobs on the integrated list.

11. A method, comprising:

storing, in a first memory, a print job received from an information processing apparatus that creates and stores the print job in a second memory of the information processing apparatus so that the print job is stored in the first memory and the second memory at a same time;

adding the print job to a second job list maintained by a server;

generating management information including print job information on all print jobs stored in a first job list on the information processing apparatus and print job information of all print jobs stored in the second job list on the server by acquiring the first job list maintained by the information processing apparatus, and then merging the first and second job lists to generate an integrated list included in the management information, wherein a same print job can be listed twice on the integrated list; and transmitting the generated management information to a printing apparatus that executes printing based on one of the print jobs on the integrated list.

* * * * *